(12) United States Patent
Chen

(10) Patent No.: US 9,240,836 B1
(45) Date of Patent: Jan. 19, 2016

(54) OTDR FAULT TRACING IN OPTICAL NETWORKS

(71) Applicant: Verizon Patent and Licensing Inc., Arlington, VA (US)

(72) Inventor: David Z. Chen, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/455,378

(22) Filed: Aug. 8, 2014

(51) Int. Cl.
*H04B 10/071* (2013.01)
*G01M 11/00* (2006.01)

(52) U.S. Cl.
CPC ......... *H04B 10/071* (2013.01); *G01M 11/3136* (2013.01)

(58) Field of Classification Search
CPC . H04B 10/071; G01M 1/3127; G01M 1/3136
See application file for complete search history.

(56) References Cited

U.S. PATENT DOCUMENTS

| | | | |
|---|---|---|---|
| 5,177,354 A * | 1/1993 | Tomita | G02B 6/29368 250/227.15 |
| 5,187,362 A * | 2/1993 | Keeble | H04B 10/071 250/227.15 |
| 6,563,613 B1 * | 5/2003 | Tochio | H04B 10/077 398/25 |
| 8,077,298 B2 * | 12/2011 | Wang | G01M 11/3136 356/73.1 |
| 2003/0210387 A1 * | 11/2003 | Saunders | H04B 10/071 356/73 |
| 2009/0263123 A1 * | 10/2009 | Zhu | H04B 10/071 398/16 |

* cited by examiner

*Primary Examiner* — Leslie Pascal

(57) ABSTRACT

A first optical time domain reflectometer (OTDR) connects at a first location along an optical path between multiple optical transmitters and multiple optical receivers in an optical network. An optical filter, connects along the optical path, and includes multiple selectable optical wavelength blockers. A set of different length optical fibers is installed in multiple last fiber legs in the optical path. A controller selects ones of the multiple selectable wavelength blockers of the optical filter for insertion in the optical path; instructs the first OTDR to inject a first OTDR signal at the first location; receive, from the first OTDR, indications of whether a reflection of the first OTDR signal was received from each of the multiple optical receivers; and identifies faults in the optical network based on the received indications whether the reflection of the first OTDR signal was received from each of the multiple OTDR reflectors.

20 Claims, 7 Drawing Sheets

OTDR FAULT TRACING IN OPTICAL NETWORKS

BACKGROUND

A passive optical network (PON) is a network that uses unpowered optical splitters to enable a single optical fiber to serve multiple premises. A PON typically includes an optical line terminal (OLT) at one end of the network, and multiple optical network units (ONUs) near the end users of the network. Optical signals are transmitted from the OLT via an optical fiber of the network, and transmitted to each of multiple premises via one or more unpowered optical splitters. Use of the unpowered optical splitters attenuates the optical signals such that the signal strength decreases relative to noise and interference over the optical fiber(s) of the network.

DETAILED DESCRIPTION OF THE PREFERRED EMBODIMENTS

The following detailed description refers to the accompanying drawings. The same reference numbers in different drawings may identify the same or similar elements. The following detailed description does not limit the invention as claimed.

Embodiments described herein use optical time domain reflectometers (OTDRs), in conjunction with a wavelength blocking optical filter and different length fiber legs at each optical receiver, for continuity testing an optical network, such as a PON, to identify possible faults within the network. Wavelength blockers within the optical filter are selected, based on the optical wavelength of the OTDR signals used for continuity testing, to reject certain wavelengths that may interfere with measurements of reflected OTDR signals. One or more OTDRs inject OTDR signals at multiple different points along an optical path of the optical network. The reflected OTDR signals, that are reflected by reflectors at each optical receiver at a receiving end of the optical path, are then measured in the wavelength domain and the time domain to identify the particular OTDR from which the signals originated, and to identify over which leg of the optical path at the receiving end the signals are reflected. With a difference in length in a last fiber leg to each optical receiver being known, the presence or absence of reflected OTDR signals, and the time delay between each reflected OTDR signal and the original, inserted OTDR signal permits the tracing of a possible fault location within the optical network.

Figure 1:
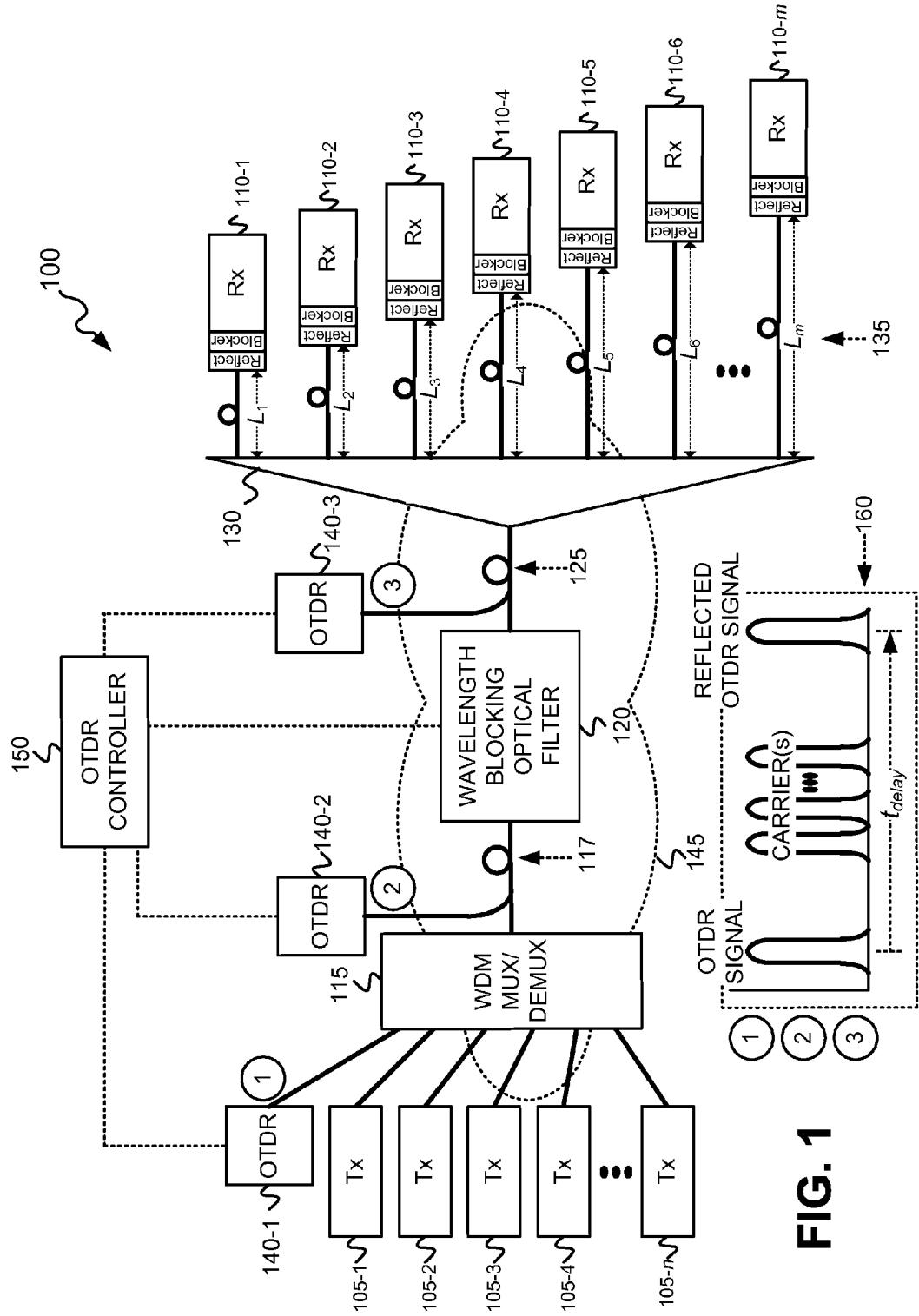
FIG. 1 is a diagram that illustrates an exemplary optical network environment in which optical time domain reflectometry may be performed to identify and trace faults in the optical network.

FIG. 1 illustrates an exemplary optical network environment 100 in which optical time domain reflectometry may be performed, as described herein using components of network environment 100, to identify and trace faults in the optical network. The optical network of network environment 100 transmits optical signals from multiple different optical transmitters 105-1 through 105-n (generically and individually referred to herein as "Tx 105") to multiple different optical receivers 110-1 through 110-m (generically and individually referred to herein as "Rx 110"), where n and m each include a same, or different, positive integer greater than or equal to one. In FIG. 1, the optical network 145 (shown with dashed lines in the figure) may include a PON that further includes the network components (including connecting optical fibers) on the optical path(s) between optical transmitters 105-1 through 105-n and optical receivers 110-1 through 110-m. Optical network 145 may not include transmitters 105-1 through 105-n, optical receivers 110-1 through 110-m, OTDRs 140-1 through 140-3, and OTDR controller 150.

Optical network environment 100 may include optical transmitters 105-1 through 105-n, wavelength division multiplexing multiplexer/demultiplexer (WDM MUX/DEMUX) 115, optical fiber 117, wavelength blocking optical filter 120, optical fiber 125, optical splitter(s) 130, last optical fiber legs 135, optical receivers 110-1 through 110-m, one or more Optical Time Domain Reflectometers (OTDRs) 140-1 through 140-3, and OTDR controller 150.

Optical transmitters 105-1 through 105-n may each include any type of data source that transmits optical signals for transit over the optical network 145 to at least one of optical receivers 110-1 through 110-m. For example, each of optical transmitters 105-1 through 105-n may include an optical line terminal (OLT), a terminal connected to a metro-Ethernet, a terminal connected to a wireless network, an Optical Time Domain Reflectometer (OTDR) terminal, a terminal connected to a video source, etc. Each of optical transmitters 105-1 through 105-n may transmit optical signals at an optical wavelength from one or more bands of optical wavelengths. For example, Tx 105 may transmit optical signals at a wavelength within an "O" band ranging from 1260 to 1360 nanometers (nm). Other bands may include the "E" band from 1360 to 1460 nm, the "S" band from 1460-1530 nm, the "C" band, from 1530-1560 nm, the "L" band from 1560-1625 nm, and/or the "U" band from 1625-1675 nm.

As shown in FIG. 1, optical transmitters 105-1 through 105-n may connect to WDM MUX/DEMUX 115. WDM MUX/DEMUX 115 may wavelength division multiplex the optical signals received from transmitters 105-1 through 105-n for transmission out over a single optical fiber 117. In one implementation, optical fiber 117 may include a single fiber path through a Passive Optical Network (PON) (shown as a dotted network cloud 145 in FIG. 1). The wavelength multiplexed optical signals from MUX/DEMUX 115 may be received at wavelength blocking optical filter 120.

Optical filter 120 may include a set of optical filters that may be selectively inserted into the signal path to filter certain wavelengths from the multiplexed optical signals transiting the network 145 between fiber 117 and fiber 125. Optical filter 120, as described further below with respect to FIGS. 2A and 2B, may include multiple optical filters, where each of the optical filters blocks a certain range of optical wavelengths and passes optical wavelengths outside of the certain range. The multiple optical filters may, automatically or manually, be inserted into the optical signal path in a cascaded fashion to block one or more ranges of optical wavelengths. Optical filter 120 passes filtered optical signals to optical splitter(s) 130 via optical fiber 125.

Optical splitter(s) 130 may include one or more optical splitters that split input optical signals to multiple outputs such that each of optical receivers 110-1 through 110-m receives the wavelength division multiplexed optical signals transmitted over the optical network 145. Optical splitter(s) 130 may, for example, include multiple 50/50 optical splitters cascaded together to enable a single fiber input to output to m fiber outputs (i.e., to m optical receivers). Use of multiple 50/50 splitters, however, results in significant signal loss at optical splitter(s) 130 such that signal cross-talk and interference may substantially interfere with OTDR reflected signals reflected back from optical receivers 110-1 through 110-m. Wavelength blockers of optical filter 120 may be selected so as to filter signal cross-talk and interference, and other interfering wavelengths, to eliminate signals that interfere with the measurement of reflected OTDR signals.

Each of optical receivers 110-1 through 110-m (where m is a positive integer greater than or equal to one) receives the optical signals via optical fiber 125 and splitter(s) 130 over a respective last fiber leg 135 having a length $L_x$ (where x is a positive integer). A sequence of different fiber lengths is installed as a last fiber leg 135 for each of optical receivers 110-1 through 110-m such that each optical receiver 110-1 through 110-m has a last fiber leg 135 length 10-30 meters longer than the previous receiver last fiber leg. For example, last fiber leg 135 of optical receiver 110-2 has a length $L_2$ that is 10-30 meters longer than the length $L_1$ of last fiber leg 135 of optical receiver 110-1. Last fiber leg 135 of optical receiver 110-3 has a length $L_3$ that is 10-30 meters longer than the length $L_2$ of last fiber leg 135 of optical receiver 110-2, last fiber leg 135 of optical receiver 110-4 has a length $L_4$ that is 10-30 meters longer than the length $L_3$ of last fiber leg 135 of optical receiver 110-3, and so on.

OTDRs 140-1, 140-2 and/or 140-3 may inject OTDR optical signals at certain locations of the optical network 145 for tracing optical faults. For example, as shown in FIG. 1, OTDR 140-1 may inject (shown with a "1" within a circle) an OTDR optical signal at a first wavelength at an input to MUX/DEMUX 115 for transit via MUX/DEMUX 115, fiber 117, optical filter 120, fiber 125, optical splitter(s) 130 and last fiber leg 135. As a further example, OTDR 140-2 may inject (shown with a "2" within a circle) an OTDR optical signal at a second wavelength at a location along optical fiber 117 for transit via fiber 117, optical filter 120, optical fiber 125, optical splitter 130 and last fiber leg 135. As an additional example, OTDR 140-3 may inject (shown with a "3" within a circle) an OTDR optical signal at a third wavelength at a location along optical fiber 125 for transit via fiber 125, optical splitter(s) 130, and last fiber leg 135. The first wavelength at OTDR 140-1, the second wavelength at OTDR 140-2 and the third wavelength 140-3 may each be the same optical wavelength, or may be different optical wavelengths from one another. In one implementation, OTDR 140-1, 140-2 and 140-3 may include the same OTDR device that is sequentially relocated to different locations along the optical transmission path of the optical network 145 for injecting OTDR signals. In another implementation, OTDR 140-1, 140-2 and 140-3 may include different OTDR devices that are simultaneously connected to the optical network 145 at different locations and which are centrally controlled by OTDR controller 150. OTDR controller 150 may, as a separate and distinct network device, connect to each of OTDRs 140-1, 140-2 and 140-3 via wired or wireless links, or via an intervening network (e.g., via the Internet). In a further implementation, one of OTDRs 140-1, 140-2 or 140-3 acts as a central controller, instead of controller 150. In such an implementation, the OTDR acting as controller 150 connects to each of the other OTDRs via wired or wireless links, or via a network. For example, OTDR 140-1 may act as a central controller, and may provide instructions to OTDRs 140-2 and 140-3 via a network, and may receive OTDR signal measurements from OTDRs 140-2 and 140-3 via the network in response to those instructions.

As shown in FIG. 1, each of optical receivers 110-1 through 110-m includes a reflector (reflect) and a wavelength blocker (blocker) at the input side of the receiver connected to the last fiber leg 135. Each reflector reflects a range of wavelength that corresponds to the wavelengths of OTDR signals injected into the optical transmission path by OTDR 140-1, 140-2 and/or 140-3. The wavelength blocker is described below with respect to FIG. 3. Each reflector reflects OTDR signals that transit the optical transmission path, including last fiber leg 135, and which reach a respective Rx 110. The sequential increase in length of last fiber leg 135 from receiver 110-1 up through receiver 110-m causes a delay, in the time domain, of each of the reflected OTDR signals that may be measured at OTDRs 140-1, 140-2 and/or 140-3. The delay enables OTDRs 140-1, 140-2 and/or 140-3, or OTDR controller 150, to identify the Rx 110 corresponding to each reflected OTDR signal. For example, OTDR signals reflected from the reflector of optical receiver 110-2, and received at the transmitting OTDR 140, will be delayed (due to a longer last fiber leg 135) relative to OTDR signals reflected from the reflector of optical receiver 110-1.

An example OTDR signal (shown at 160 in FIG. 1), corresponding to an injected OTDR signal at OTDR 140-1 (shown as a "1" within a circle), 140-2 (shown as a "2" within a circle) or 140-3 (shown as a "3" within a circle), is depicted in conjunction with other carrier signals that may be transmitted by transmitters 105-1 through 105-n. As further shown, a reflected OTDR signal is received at OTDR 140 after a sufficient delay ($t_{delay}$) caused by transit of the reflected signal from the reflector of the Rx 110 backwards through the optical transmission path to OTDR 140. Different delay times, corresponding to each different length last fiber leg 135, enables OTDR 140, or OTDR controller 150, to trace continuity through the optical path from MUX/DEMUX 115 to Rx 110, as discussed further below with respect to the process of FIG. 4, and FIGS. 5 and 6.

Optical receivers 110-1 through 110-m may each include any type of optical receiver that receives optical signals transmitted over the optical network 145 in one or more bands of optical wavelengths. For example, each of optical receivers 110-1 through 110-m may include an optical network unit (ONU), a receiver connected to a local area network (LAN) (e.g., Ethernet), a receiver connected to a wireless network, and/or a receiver connected to a metropolitan area network (MAN) (e.g., a metro-Ethernet). Optical receiver 110 may receive optical signals at wavelengths within the O, E, S, C, L or U bands, or some portion of such bands.

The configuration of network components of network environment 100 shown in FIG. 1 is for illustrative purposes. Other configurations may be implemented. Therefore, network environment 100 may include additional, fewer and/or different components, that may be configured in a different arrangement, than that depicted in FIG. 1.

Figure 2A:
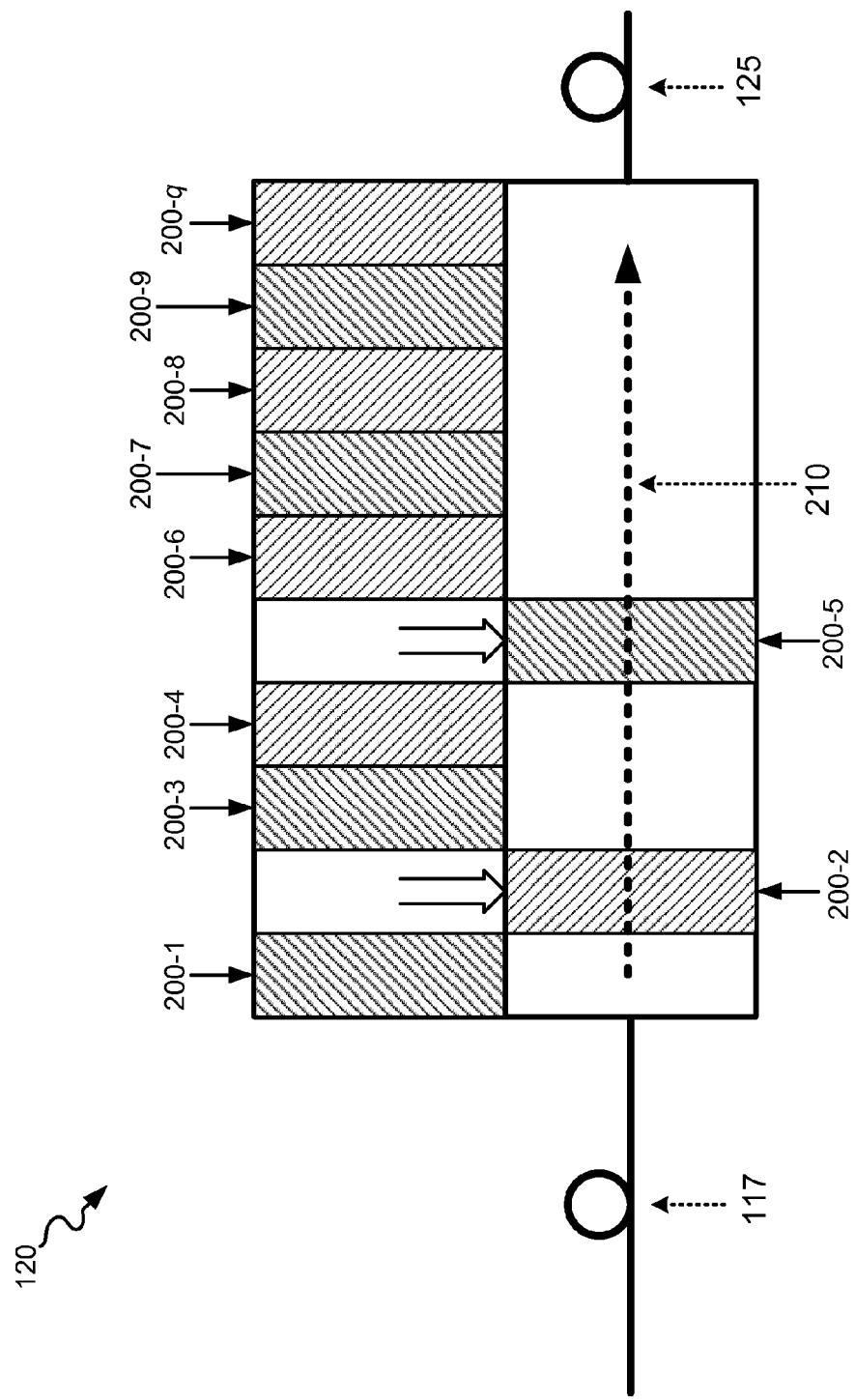
FIGS. 2A and 2B are diagrams that depict examples of the wavelength blocking optical filter of FIG. 1.
Figure 2B:
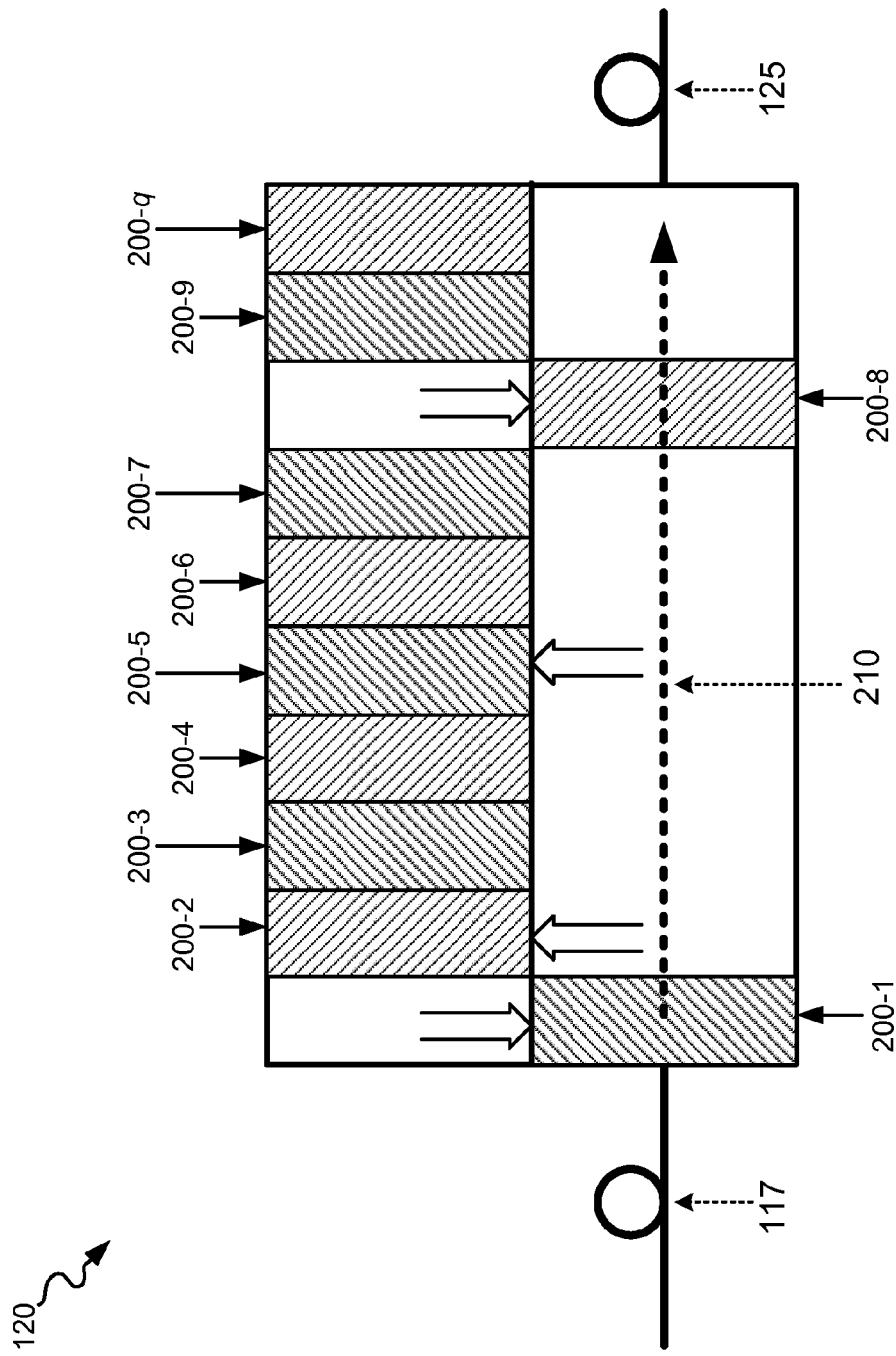

FIGS. 2A and 2B depict examples of wavelength blocking optical filter 120. Optical filter 120 includes multiple wavelength blockers 200-1 through 200-q (where q is greater than or equal to two). Ten wavelength blockers are shown in FIGS. 2A and 2B by way of example, and fewer or more wavelength blockers may be included in optical filter 120. Each of wavelength blockers 200-1 through 200-q selectively blocks light of different wavelengths, permitting only light outside of the blocked wavelengths to pass. Wavelength blockers may be selectively inserted into the optical path 210 through optical filter 120 to block one or more wavelength ranges of light. In one implementation, each of wavelength blockers 200-1 through 200-q may independently and manually be slid into position in the optical path 210. In another implementation, automatic mechanisms may be included in optical filter 120 for selectively inserting wavelength blockers 200-1 through 200-q into optical path 210, or for selectively removing wavelength blockers 200-1 through 200-q from optical path 210, based on control signals entered by an operator, or by control signals received from OTDRs 140-1, 140-2 and/or 140-3 or received from OTDR controller 150. For example, as shown in FIG. 2A, wavelength blockers 200-2 and 200-5 are manually or automatically slid into optical path 210. As shown in a further example of FIG. 2B, wavelength blockers 200-2 and 200-5 are manually or automatically slid out of the optical path 210, and wavelength blockers 200-1 and 200-8 are slid into optical path 210. Each of wavelength blockers 200-1 through 200-q may, in one implementation, include a glass or plastic absorptive filter. In other implementations, more complex blocking filters, such as interference or dichroic filters, may be used.

Manual selection of wavelength blockers may involve an operator or technician physically (i.e., by hand) sliding selected wavelength blockers into, or out of, optical path 210. Automatic selection of wavelength blockers may involve powered mechanisms within optical filter 120 (not shown in FIGS. 2A and 2B) that can slide selected wavelength blockers into, or out of, optical path 210 based on externally applied inputs, such as, for example, external control signals supplied by OTDRs 140-1, 140-2 and/or 140-3, or by OTDR controller 150, to optical filter 120. The powered mechanisms may selectively slide certain wavelength blockers into, or out of, optical path 210 based on the control signals received from OTDRs 140-1, 140-2 and/or 140-3, or OTDR controller 150.

The specific wavelength blockers of wavelength blockers 200-1 through 200-q may be selected based on the wavelength(s) of the OTDR signals injected into the optical network 145 by OTDRs 140-1, 140-2 and/or 140-3 so as to block optical wavelengths that negatively impact, or interfere with, OTDR signal tracing (e.g., noise, cross-talk). For example, if an OTDR signal of wavelength $\lambda_1$ is injected into the optical network 145 by OTDR 140-1, then wavelength blockers 200-1 through 200-q, blocking wavelengths corresponding to ranges of wavelengths greater than or less than wavelength $\lambda_1$, may be inserted into optical path 210 to block wavelengths that may interfere with measurement of the reflected OTDR signal. In most circumstances, the insertion of wavelength blockers 200-1 through 200-q into optical path 210 should be done so as to not block optical wavelengths associated with voice, data and/or video service signals being transmitted from transmitters 105-1 through 105-n, but blocking other optical wavelengths that may negatively impact, or interfere with, the OTDR signal tracing. Therefore, in addition to blocking optical wavelengths that interfere with OTDR signal tracing, specific wavelength blockers 200 of optical filter 120 should be inserted, or not inserted, so as to ensure that wavelengths for service signals (e.g., voice, data, and/or video signals transmitted from transmitters 105-1 through 105-n) are allowed to pass and transit optical network 145 to reach optical receivers 110-1 through 110-m. The wavelength blockers of optical filter 120 may further be selected to block or pass wavelengths associated with OTDRs 140-1, 140-2 and/or 140-3. For example, if OTDR 140-1 is performing OTDR signal tracing at a wavelength $\lambda_1$, the wavelength blockers of optical filter 120 may be inserted to block wavelengths $\lambda_2$ and $\lambda_3$ associated with OTDRs 140-2 and 140-3, respectively, if they are not performing OTDR signal tracing.

As another example, if OTDR 140-2 is performing OTDR signal tracking at wavelength $\lambda_2$, the wavelength blockers of optical filter 120 may be inserted to block wavelengths $\lambda_1$ and $\lambda_3$ associated with OTDRs 140-1 and 140-3, respectively, if they are not performing OTDR signal tracing.

The configuration of components of optical filter 120 shown in FIGS. 2A and 2B is for illustrative purposes. Other configurations may be implemented. Therefore, optical filter 120 may include additional, fewer and/or different components, that may be configured in a different arrangement, than that depicted in FIGS. 2A and 2B.

Figure 3:
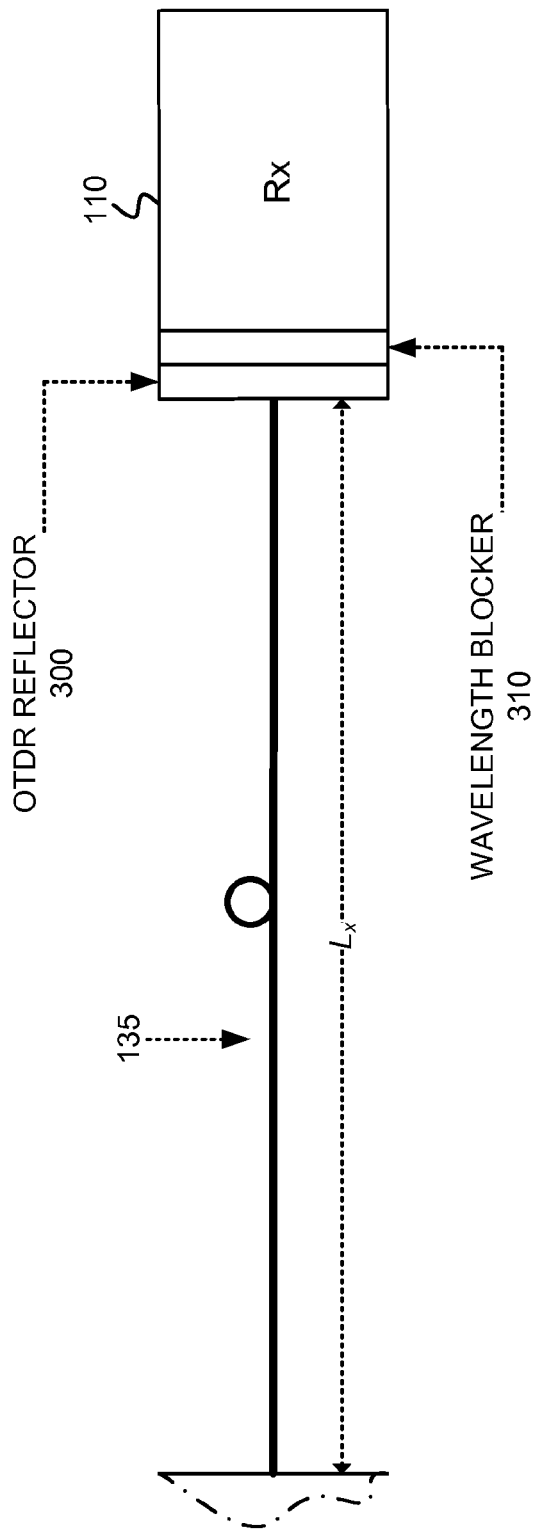
FIG. 3 depicts an optical receiver connected to a last fiber leg in the optical network environment of FIG. 1.

FIG. 3 depicts an optical receiver 110 connected to a last fiber leg 135 in the optical network 145. As shown, last fiber leg 135, having a length of length of $L_x$, is connected to Rx 110 (where 1≤x≤m). As further shown in FIG. 3, Rx 110 includes an OTDR reflector 300 and a wavelength blocker 310 for receiving optical signals via last fiber leg 135. OTDR reflector 300 may be fixed, or may be dynamically tunable. OTDR reflector 300 includes a suitable material designed to reflect optical wavelengths that correspond to the wavelengths of OTDR signals injected by OTDRs 140-1, 140-2 and/or 140-3, but doesn't reflect signals at other optical wavelengths such as the wavelengths associated with voice, data and/or video sent from a specific Tx 105. For example, OTDR reflector 300 may reflect optical signals within an optical wavelength range of $\lambda_1$-$\lambda_2$ nm, where $\lambda_2$>$\lambda_1$ and where OTDR signals are then injected into the optical network 145 in the range of $\lambda_1$-$\lambda_2$ nm. OTDR signals within the range of $\lambda_1$-$\lambda_2$ nm are reflected back through the optical network 145 to return to OTDRs 140-1, 140-2 and/or 140-3. Wavelength blocker 310 includes an optical filter that blocks optical wavelengths of certain optical wavelengths, and passes optical wavelengths of other optical wavelengths. Wavelength blocker 310 may be fixed, or may be dynamically tunable. Wavelength blocker 310 may pass optical wavelengths based on the specific type of Rx 110 or based on the specific type of Tx 105 optical signals from which Rx 110 is designed to receive and process. For example, if Rx 110 is an ONU that is to receive optical signals from Tx 105 transmitting within the S band (i.e., 1460-1530 nm), then wavelength blocker 310 may pass optical wavelengths in the S band, and block wavelengths outside of the S band. Wavelength blocker 310 may be selected (if fixed), or dynamically tuned (if tunable), to receive and pass optical signals at one or more specific ranges of wavelengths transmitted from a specific Tx 105 (and associated with a specific voice, data, and/or video application), and to block other wavelengths. Rx 110 may include mechanisms for detecting incoming optical signals that manage to pass through OTDR reflector 300 and wavelength blocker 310, and convert the incoming signals to corresponding electrical signals for further processing.

Figure 4:
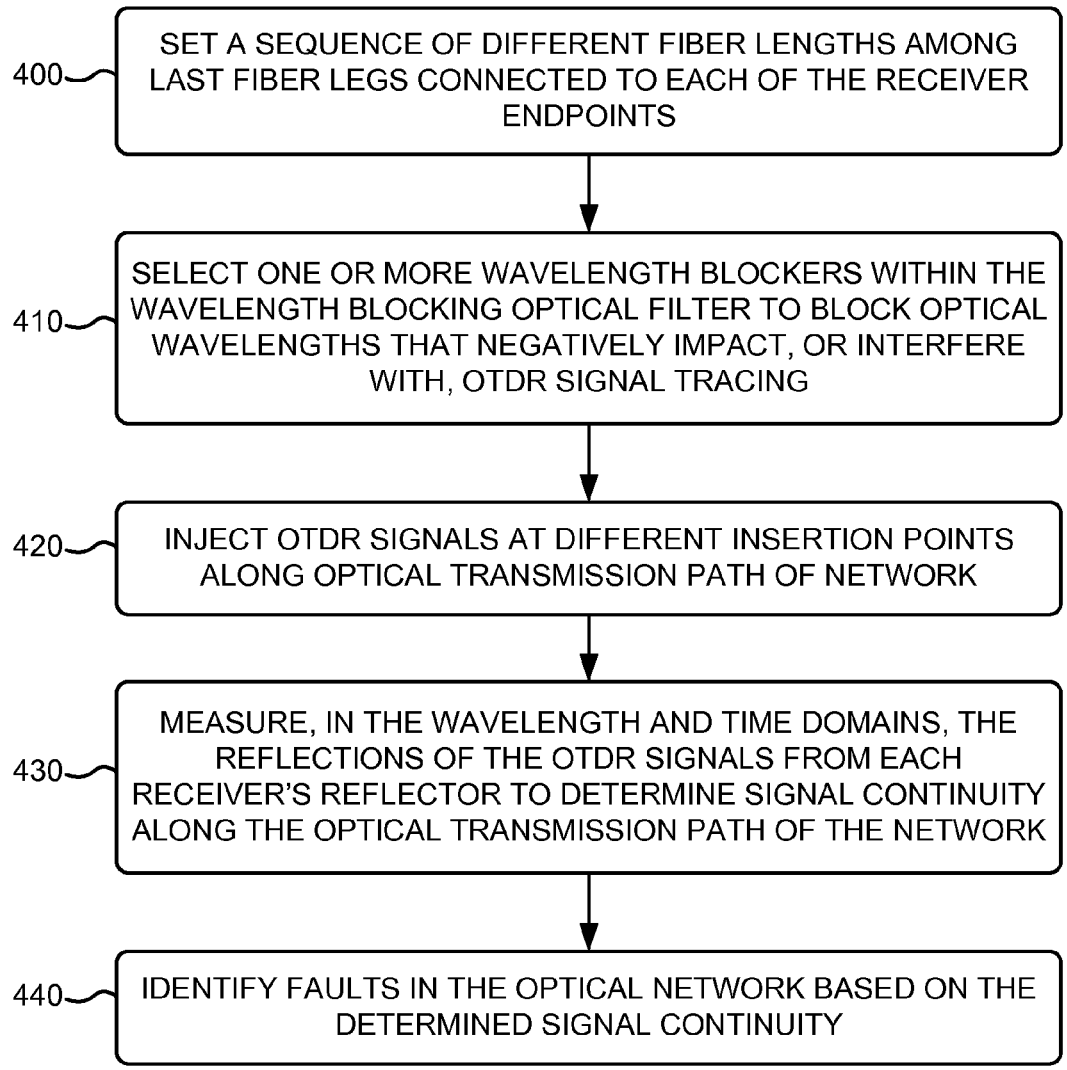
FIG. 4 is a flow diagram of an exemplary process identifying and tracing faults in an optical network based on determining signal continuity using optical time domain reflectometers.

FIG. 4 is a flow diagram of an exemplary process identifying and tracing faults in an optical network 145 based on determining signal continuity using OTDRs. The exemplary process of FIG. 4 may be implemented by OTDRs 140-1, 140-2 and/or 140-3 either alone, together, or together in conjunction with OTDR controller 150. In some implementations, one or more blocks of FIG. 4 may be implemented manually by an operator/technician. For example, in one implementation, blocks 400, 410, 420, 430 and 440 are implemented manually by an operator/technician using a single OTDR 140. In another example, blocks 400 and 410 may be implemented manually by an operator/technician (e.g., operator/technician manually selects wavelength blockers of optical filter 120), and blocks 420-440 may be implemented automatically by OTDR controller 150 controlling, and receiving OTDR measurement information from, OTDRs 140-1, 140-2 and/or 140-3. In a further example, block 400 may be implemented manually by an operator/technician (e.g., operator/technician(s) manually installs last fiber legs 135 at each Rx 110), and blocks 410-440 may be implemented automatically by OTDR controller 150 controlling, and receiving OTDR measurement information from, OTDRs 140-1, 140-2 and/or 140-3. The exemplary process of FIG. 4 is described with respect to the example OTDR signal diagrams of FIGS. 5 and 6.

The exemplary process may include setting a sequence of different fiber lengths among the last fiber legs connected to each of the receiver endpoints of the optical network 145 (block 400). Referring to FIG. 1, during fiber installation, a different fiber length ($L_1 < L_2 < L_3 < L_4 \ldots$) is installed at each last fiber leg 135 to optical receivers 110-1 through 110-m. A difference of 10-30 meters may exist between each fiber length $L_x$ and $L_{x+1}$. A technician(s) associated with the optical network 145 may install the last fiber legs 135 to each of the optical receivers 110-1 through 110-m.

One or more wavelength blockers within wavelength blocking optical filter 120 may be selected to block optical wavelengths that negatively impact, or interfere with, OTDR signal tracing (block 410). In one implementation, the one or more wavelength blockers may be manually selected by an operator/technician. For example, as shown in FIG. 2A, a technician may manually select wavelength blockers 200-2 and 200-5 for insertion into the optical path 210. In another implementation, the one or more wavelength blockers may be selected by control signals from OTDRs 140-1, 140-2 and/or 140-3, or OTDR controller 150. Upon receipt of the control signals, powered mechanisms within optical filter 120 may move the selected wavelength blockers into, and/or remove selected wavelength blockers from, the optical path.

OTDR signals are injected at different insertion points along the optical transmission path of the optical network 145 (block 420). As shown at "1" in FIG. 1, an OTDR signal may be injected into MUX/DEMUX 115. As further shown at "2" in FIG. 1, an OTDR signal may be injected into fiber 117 between MUX/DEMUX 115 and optical filter 120. As additionally shown at "3" in FIG. 1, an OTDR signal may be injected into fiber 125 between optical filter 120 and optical splitter(s) 130. OTDR signals may be injected at other insertion points in the optical network 145 than those specifically shown in FIG. 1. A same OTDR 140 may inject each of the OTDR signals in the optical network 145, at successive times, with OTDR 140 performing both of blocks 420 and 430 at each insertion point.

Figure 5:
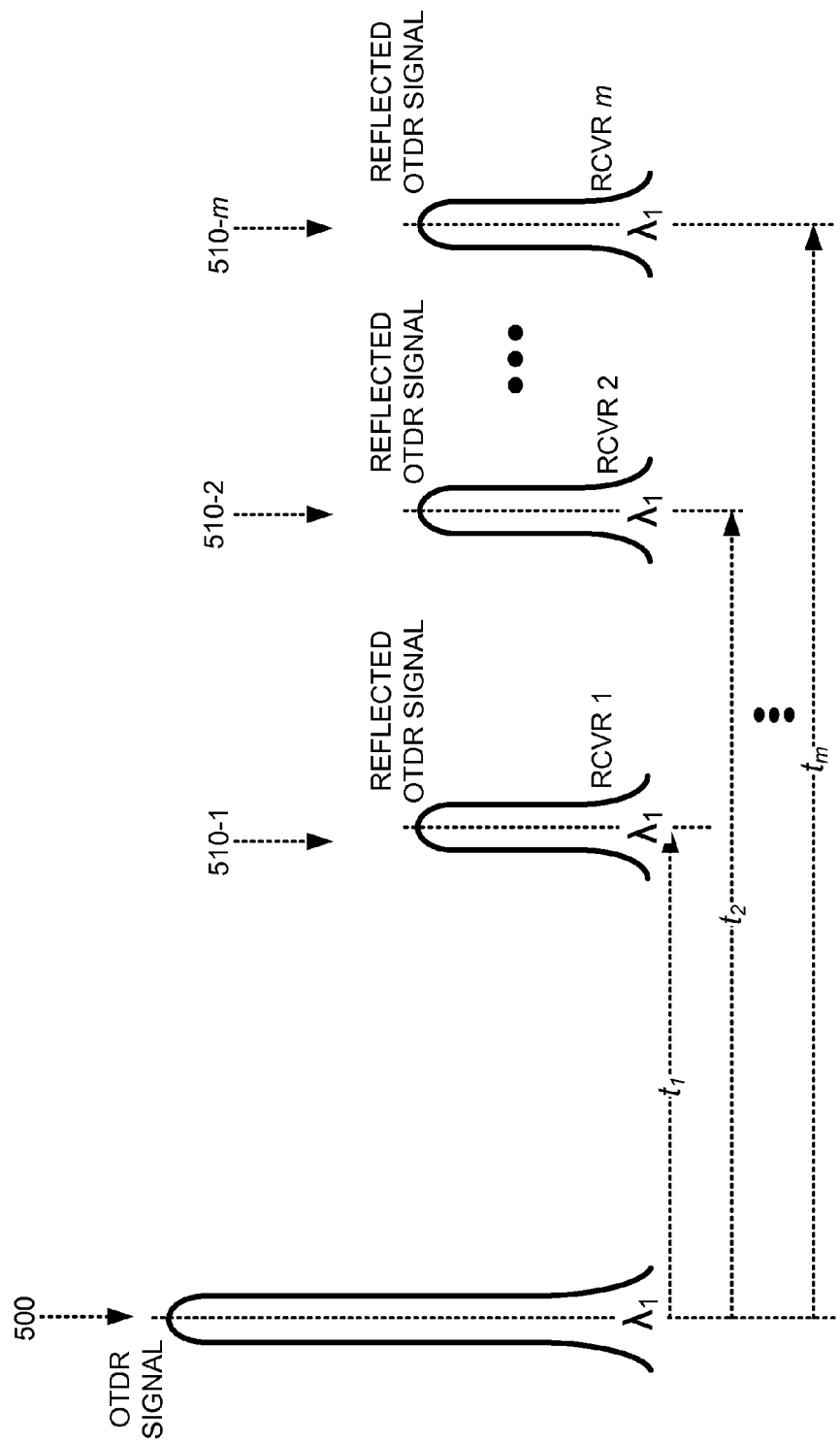
FIGS. 5 and 6 are exemplary optical time domain reflectometer signal transmission and reflection diagrams associated with the process of FIG. 4.

Reflections of the OTDR signals from each optical receiver's reflector, are measured, in the wavelength and time domains, to determine signal continuity along the optical transmission path of the optical network 145 (block 430). As shown in FIG. 5, OTDR 140-1 may inject an OTDR signal 500, at a wavelength $\lambda_1$ into the optical network 145 (such as at insertion point "1" in FIG. 1). As OTDR signal 500 transits through optical splitter(s) 130, OTDR signal 500 is split such that m versions of OTDR signal 500 transit over the last fiber leg 135 to each optical receiver 110-1 through 110-m, where each last fiber leg has a different length $L_1$-$L_m$. Upon incidence of the OTDR signal at the reflector 300 of a given Rx 110, the reflector 300 reflects the OTDR signal back through the optical network 145 to be detected and measured at OTDR 140-1, including a time delay between transmission of OTDR signal 500, and receipt of the reflection of the OTDR signal at OTDR 140-1.

For example, a reflected OTDR signal 510-1 is reflected from reflector 300 of optical receiver 110-1 and received back at OTDR 140 after a delay time of $t_1$. Another reflected OTDR signal 510-2 is reflected from reflector 300 of optical receiver 110-2 and received back at OTDR 140 after a delay time of $t_2$, where $t_2 > t_1$. Furthermore, a further reflected OTDR signal 530-m is reflected from reflector 300 of optical receiver 110-m and received back at OTDR 140 after a delay time of tm, where $t_m > t_2 > t_1$. The time delay between each of reflected OTDR signals 510-1 through 510-m can be characterized, such that the absence of any one of OTDR signals 510-1 through 510-m may be determined to trace continuity of the optical path between MUX/DEMUX 115 and optical receivers 110-1 through 110-m. In other words, absence of an expected reflected OTDR signal having an expected time delay, which would otherwise be associated with a particular last fiber leg, suggests a loss of continuity somewhere in the optical path associated with that particular last fiber leg.

Figure 6:
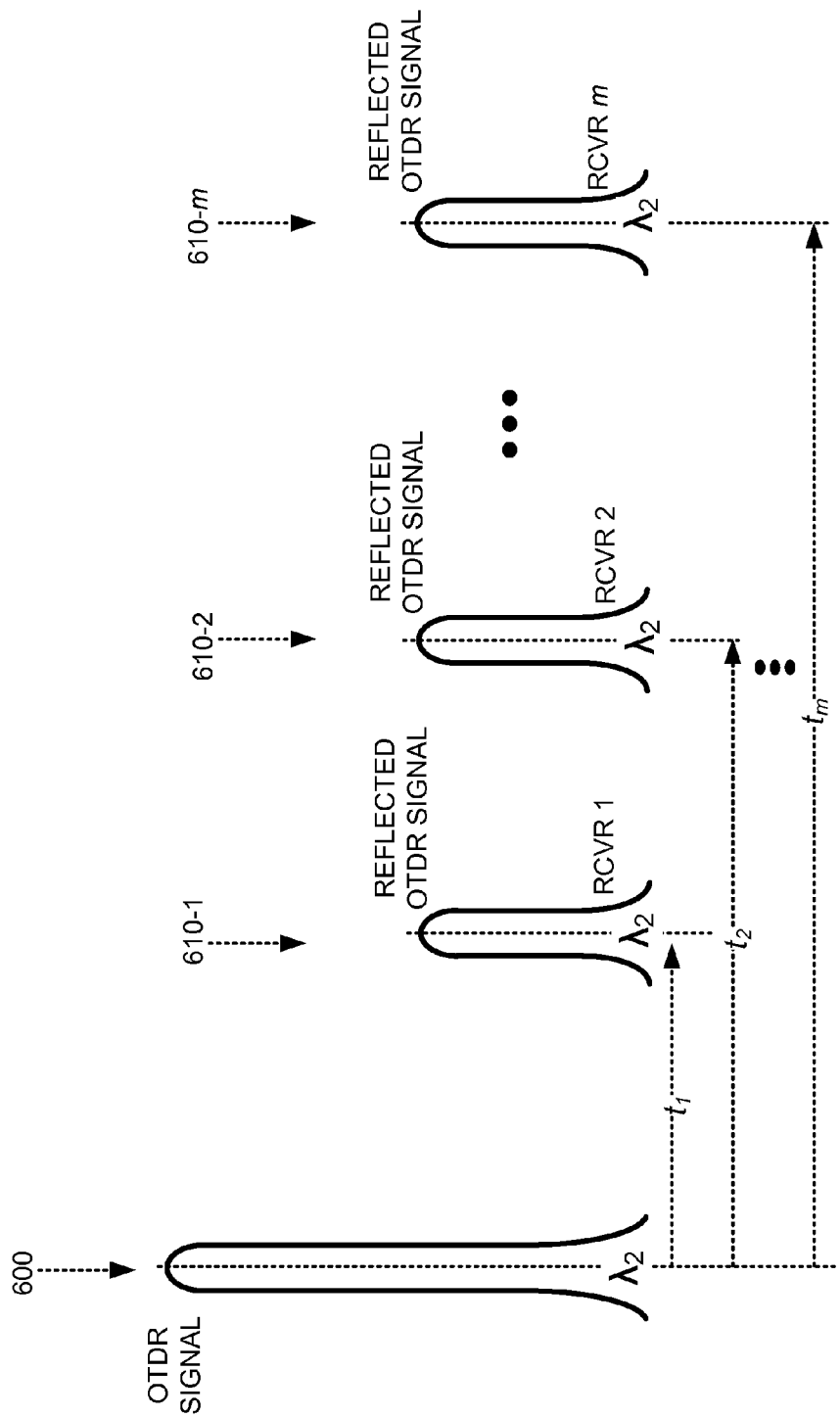

As shown in FIG. 6, OTDR 140-2 may inject an OTDR signal 600, at a wavelength $\lambda_2$ into the optical network 145 (such as at insertion point "2" in FIG. 1). As OTDR signal 600 transits through optical splitter(s) 130, OTDR signal 600 is split such that m versions of OTDR signal 600 transit over the last fiber leg 135 to each optical receiver 110-1 through 110-m, where each last fiber leg has a different length $L_1$-$L_m$. Upon incidence of the OTDR signal at the reflector 300 of a given optical receiver, the reflector 300 reflects the OTDR signal back through the optical network 145 to be detected and measured at OTDR 140-2, including a time delay between transmission of OTDR signal 600, and receipt of the reflection of the OTDR signal at OTDR 140-2.

For example, a reflected OTDR signal 610-1 is reflected from reflector 300 of optical receiver 110-1 and received back at OTDR 140-2 after a delay time of $t_1$. Another reflected OTDR signal 610-2 is reflected from reflector 300 of optical receiver 110-2 and received back at OTDR 140-2 after a delay time of $t_2$, where $t_2 > t_1$. Furthermore, a further reflected OTDR signal 530-m is reflected from reflector 300 of optical receiver 110-m and received back at OTDR 140-2 after a delay time of $t_m$, where $t_m > t_2 > t_1$. The time delay between each of reflected OTDR signals 610-1 through 610-m can be characterized, such that the absence of any one of OTDR signals 610-1 through 610-m may be determined to trace continuity of the optical path between optical fiber 115 and optical receivers 110-1 through 110-m. As noted, absence of an expected reflected OTDR signal having an expected time delay, which would otherwise be associated with a particular last fiber leg, suggests a loss of continuity somewhere in the optical path associated with that particular last fiber leg. The different wavelength $\lambda_2$ used by OTDR 140-2, as compared to wavelength $\lambda_1$ used by OTDR 140-1, enables OTDRs 140-1 and 140-2 (and 140-3 in a situation where a third OTDR is used) to distinguish, in the wavelength domain, between the reflected OTDR signals, and the time delay associated with each reflected OTDR signal enables OTDRs 140-1 and 140-2 (and 140-3 and OTDR controller 150) to trace the signal continuity of the optical path from one end of the optical network 145 to the other end of the optical network 145 (e.g., to optical receivers 110-1 through 110-m). Similarly (but not shown in FIGS. 5 and 6), OTDR 140-3 may inject an OTDR signal, at a wavelength $\lambda_3$, into the optical network 145 (such as at insertion point "3" in FIG. 1) and the reflected OTDR signals from reflectors 300 at each optical receiver 110-1 through 110-m may be measured, in both the wavelength domain and time domain, at OTDR 140-3, as described above with respect to OTDRs 140-1 and 140-2.

Faults in the optical network 145 may be identified based on the determined signal continuity (block 440). For example, if OTDR reflected signals from reflector 300 of optical receiver 110-2 are consistently missing from OTDR signals injected at multiple places in the optical network 145, but OTDR reflected signals from reflectors 300 from other optical receivers 110-1 and 110-3 through 110-m are not missing, then it may be determined that there is a fault associated with the last fiber leg of length $L_2$. As another example, if reflected OTDR signals, associated with an OTDR signal injected by OTDR 140-3 at insertion point "3," are all received at OTDR 140-3, but OTDRs 140-1 and 140-2 receive no reflected OTDR signals, then it may be determined that there is a fault between optical fiber 117 and optical fiber 125 (including a possible fault in optical filter 120).

The foregoing description of implementations provides illustration and description, but is not intended to be exhaustive or to limit the invention to the precise form disclosed. Modifications and variations are possible in light of the above teachings or may be acquired from practice of the invention. While a series of blocks has been described with respect to FIG. 4, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system, comprising:
    a first optical time domain reflectometer (OTDR) connects at a first location along an optical path between multiple optical transmitters and multiple optical receivers in an optical network;
    an optical filter, connected along the optical path, and comprising multiple selectable optical wavelength blockers;
    a set of different length optical fibers installed in multiple last fiber legs in the optical path, wherein a different length optical fiber of the set of different length optical fibers is installed in a different one of the multiple last fiber legs to a different one of the multiple optical receivers;
    multiple OTDR reflectors, wherein a different one of the multiple OTDR reflectors is installed at each of the multiple optical receivers; and
    a controller configured to:
        select one or more first ones of the multiple selectable wavelength blockers of the optical filter for insertion in the optical path,
        instruct the first OTDR to inject a first OTDR signal at the first location at a first wavelength,
        receive, from the first OTDR, indications of whether a reflection of the first OTDR signal was received from each of the multiple OTDR reflectors, and
        identify faults in the optical network based on the received indications whether the reflection of the first OTDR signal was received from each of the multiple OTDR reflectors.

2. The system of claim 1, wherein the first OTDR is the controller.

3. The system of claim 1, wherein the controller is a separate and distinct device from the first OTDR.

4. The system of claim 1, further comprising:
    a second optical time domain reflectometer (OTDR) connected at a second location along the optical path between the multiple optical transmitters and the multiple optical receivers in the optical network;
    wherein the controller is further configured to:
        instruct the second OTDR to inject a second OTDR signal at the second location at a second wavelength,
        receive, from the second OTDR, indications of whether a reflection of the second OTDR signal was received from each of the multiple OTDR reflectors, and
        identify faults in the optical network based on the received indications whether the reflection of the first OTDR signal and the second OTDR signal was received from each of the multiple OTDR reflectors.

5. The system of claim 4, wherein the controller connects to the first OTDR and the second OTDR via a network.

6. The system of claim 4, wherein the controller is further configured to:
    select one or more second ones of the multiple selectable wavelength blockers of the optical filter for insertion in the optical path prior to injection of the second OTDR signal.

7. The system of claim 1, further comprising:
    a third optical time domain reflectometer (OTDR) connected at a third location along the optical path between the multiple optical transmitters and the multiple optical receivers in the optical network;
    wherein the controller is further configured to:
        instruct the third OTDR to inject a third OTDR signal at the third location at a third wavelength,
        receive, from the third OTDR, indications of whether a reflection of the third OTDR signal was received from each of the multiple OTDR reflectors, and
        identify faults in the optical network based on the received indications whether the reflection of the first OTDR signal, the second OTDR signal, and the third OTDR signal was received from each of the multiple OTDR reflectors.

8. The system of claim 7, wherein the controller is further configured to:
    select one or more third ones of the multiple selectable wavelength blockers of the optical filter for insertion in the optical path prior to injection of the third OTDR signal.

9. The system of claim 1, wherein each of the multiple optical transmitters comprises one of an optical line terminal (OLT), a terminal connected to a metro-Ethernet, a terminal connected to a wireless network, an Optical Time Domain Reflectometer (OTDR) terminal, or a terminal connected to a video source.

10. The system of claim 1, wherein each of the multiple optical receivers comprises one of an optical network unit (ONU), a receiver connected to a local area network (LAN), a receiver connected to a wireless network, and/or a receiver connected to a metropolitan area network (MAN).

11. A method, comprising:
    selecting one or more of the multiple selectable wavelength blockers of an optical filter for insertion in an optical path between multiple optical transmitters and multiple optical receivers in an optical network;

causing a first optical time domain reflectometer (OTDR), connected at a first location along the optical path, to inject a first OTDR signal into the optical path such that the first OTDR signal transits the optical network through a set of different length optical fibers installed in a last fiber leg in the optical path, wherein a different length optical fiber of the set of different length optical fibers is installed in the last fiber leg to each of the multiple optical receivers;

receiving, via the first OTDR, indications of whether a reflection of the first OTDR signal is received from each of multiple OTDR reflectors installed at the multiple optical receivers, and identifying faults in the optical network based on the received indications whether the reflection of the first OTDR signal was received from each of the multiple OTDR reflectors.

12. The method of claim 11, further comprising:

causing a second optical time domain reflectometer (OTDR), connected at a second location along the optical path, to inject a second OTDR signal into the optical path such that the second OTDR signal transits the optical network through the set of different length optical fibers installed in the last fiber leg in the optical path;

receiving, via the second OTDR, indications of whether a reflection of the second OTDR signal is received from each of multiple OTDR reflectors installed at the multiple optical receivers, and identifying faults in the optical network based on the received indications whether the reflection of the first OTDR signal and the second OTDR signal was received from each of the multiple OTDR reflectors.

13. The method of claim 12, further comprising:

causing a third optical time domain reflectometer (OTDR), connected at a third location along the optical path, to inject a third OTDR signal into the optical path such that the third OTDR signal transits the optical network through the set of different length optical fibers installed in the last fiber leg in the optical path;

receiving, via the third OTDR, indications of whether a reflection of the third OTDR signal is received from each of multiple OTDR reflectors installed at the multiple optical receivers, and identifying faults in the optical network based on the received indications whether the reflection of the first OTDR signal, the second OTDR signal, and the third OTDR signal was received from each of the multiple OTDR reflectors.

14. A system, comprising:

a first optical time domain reflectometer (OTDR) connected at a first location along an optical path between multiple optical transmitters and multiple optical receivers in an optical network;

a second optical time domain reflectometer (OTDR) connected at a second location along the optical path between the multiple optical transmitters and the multiple optical receivers in the optical network;

an optical filter, connected along the optical path, and comprising multiple selectable optical wavelength blockers;

a set of different length optical fibers installed in multiple last fiber legs in the optical path, wherein a different length optical fiber of the set of different length optical fibers is installed in a different one of the multiple last fiber legs to a different one of the multiple optical receivers; and a controller configured to:
  select one or more of the multiple selectable wavelength blockers of the optical filter for insertion in the optical path,
  instruct the first OTDR to inject a first OTDR signal at the first location,
  instruct the second OTDR to inject a second OTDR signal at the second location,
  receive, from the first OTDR and the second OTDR, indications of whether a reflection of the first OTDR signal and the second OTDR signal was received from each of the multiple optical receivers, and
  identify faults in the optical network based on the received indications whether the reflection of the first OTDR signal and the second OTDR signal was received from each of the multiple optical receivers.

15. The system of claim 14, wherein each of the multiple optical transmitters comprises one of an optical line terminal (OLT), a terminal connected to a metro-Ethernet, a terminal connected to a wireless network, an Optical Time Domain Reflectometer (OTDR) terminal, or a terminal connected to a video source.

16. The system of claim 14, wherein each of the multiple optical receivers comprises one of an optical network unit (ONU), a receiver connected to a local area network (LAN), a receiver connected to a wireless network, and/or a receiver connected to a metropolitan area network (MAN).

17. The system of claim 14, further comprising:

a third OTDR connected at a third location along the optical path between the multiple optical transmitters and the multiple optical receivers in the optical network;

wherein the controller is further configured to:
  instruct the third OTDR to inject a third OTDR signal at the third location,
  receive, from the third OTDR, an indication of whether a reflection of the third OTDR signal was received from each of the multiple optical receivers, and
  identify faults in the optical network based on the received indications whether the reflection of the first OTDR signal, the second OTDR signal, and the third OTDR signal was received from each of the multiple optical receivers.

18. The system of claim 17, further comprising:

multiple OTDR reflectors, wherein a different one of the multiple OTDR reflectors is installed at each of the multiple optical receivers.

19. The system of claim 14, wherein the first OTDR is the controller.

20. The system of claim 14, wherein the controller is a separate and distinct device from the first OTDR and the second OTDR.

* * * * *